United States Patent [19]

Large

[11] 4,356,905

[45] Nov. 2, 1982

[54] REMOVING MAGNETIC ARTICLES FROM A CARRIER

[75] Inventor: Donald M. Large, Temple, Pa.

[73] Assignee: Western Electric Co., Inc., New York, N.Y.

[21] Appl. No.: 194,302

[22] Filed: Oct. 6, 1980

[51] Int. Cl.³ .................... B65G 17/46; B65G 47/46
[52] U.S. Cl. ........................... 198/366; 198/439; 198/690; 209/636
[58] Field of Search ............ 198/358, 366, 436, 437, 198/439, 381, 690; 209/573, 574, 636; 271/193, 300

[56] References Cited

U.S. PATENT DOCUMENTS

| | | | |
|---|---|---|---|
| 2,687,202 | 8/1954 | Nordquist et al. | 209/636 X |
| 2,743,001 | 4/1956 | Nordquist | 209/636 X |
| 2,974,775 | 3/1961 | Stacey et al. | |
| 3,286,812 | 11/1966 | Rehm. | |
| 3,581,889 | 6/1971 | Abraham et al. | |
| 3,581,890 | 6/1971 | DeMuzio et al. | |
| 3,674,141 | 7/1972 | Abraham. | |
| 3,799,216 | 3/1974 | Kopczynski. | |
| 3,810,540 | 5/1974 | Georges. | |
| 4,262,805 | 4/1981 | Bankes et al. | |

Primary Examiner—Jeffrey V. Nase
Attorney, Agent, or Firm—D. C. Watson

[57] ABSTRACT

Elongated magnetic diodes 12 are removed from a carrier 20 having a periphery along which the diodes 12 are advanced. A magnetic bin 75 has spaced sidewalls 76 and 77 extending to either side of the periphery of carrier 20. There is established between and transverse to the sidewalls a first magnetic field of sufficient strength to remove the diodes 12 from along a first distance at a first location on carrier 20. There is provided a movable retention mechanism 70 for optionally magnetically retaining the diodes 12 on carrier 20 as such diodes 12 are advanced along and beyond the first location and over a second distance to a second location. Mechanism 70 has a magnetic member 93 fixedly disposed along the second distance and a movable magnetic member 95 of sufficient length to retain the diodes 12 along the first distance. Member 95 is pivotally mounted to member 93 and member 95 is disposed in a normally inactive position within carrier 20. To interrupt removal by bin 75, member 95 is moved to an active position such that a composite magnetic structure 90 is formed, extending for the first and second distances over which the diodes 12 are then retained on carrier 20.

16 Claims, 2 Drawing Figures

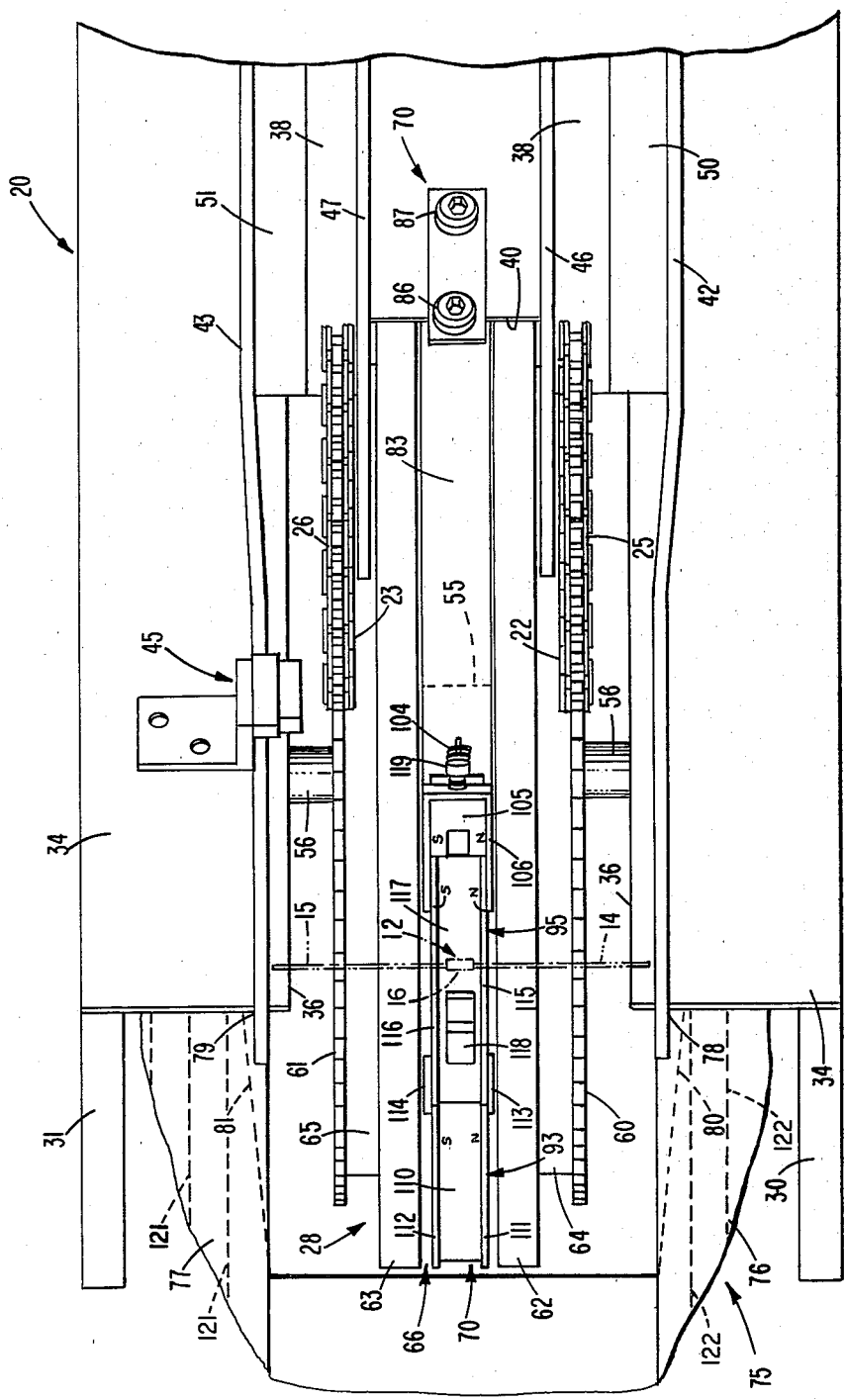

REMOVING MAGNETIC ARTICLES FROM A CARRIER

TECHNICAL FIELD

This invention relates to removing magnetic articles from a carrier. More particularly, the invention relates to removing magnetic articles from optional locations along the periphery of a carrier.

BACKGROUND OF THE INVENTION

In the production of elongated magnetic articles, such as axially leaded diodes, it is economically desirable to link various operations together in a continuous production line. The output from a sorting operation, for example, may be linked by a conveying device to a testing operation, the output therefrom may be linked to an operation for painting codes on the articles, and the output therefrom may be linked to a taping operation to prepare the articles for shipment. When all such operations work in harmony, a continuous line may be highly efficient, producing many fine articles during each hour of operation. Yet it is found that such harmony is not always maintained and the problem presented is to optionally divert the output of articles from a functioning operation to a means for storage when a link is to be broken.

The diversion problem is affected by the type of carrier advancing the articles, by the article seating, and by the normal method of removal at the output of an operation. For example, diodes may be carried by wheels, chains, air tubes, or by inclined magnetic bins and such diodes may be fixedly seated on a carrier, such as by magnets, or loosely seated in slots or notches. The diodes may be removed from a carrier by the attraction of external magnetic forces, by blows from an internal piston, or by stripping devices. Typically, the diodes are removed and received with a given orientation which also tends to bear upon the diversion problem.

In a typical operation, the articles are normally removed from a first location along a pathway of the articles by a suitable process and directed to a subsequent operation. To optionally redirect the articles, they are retained on the carrier until they reach a second location thereon where they are removed by another process suitable to a given receival means. The problem is to interrupt the normal removal process and to retain the articles on the carrier even though the articles may be loosely seated. It will be appreciated that when loosely seated articles are advanced such that the seats are tilted or inverted, retention becomes especially important.

After a diode coding operation, for example, the diodes are typically rolled on rails as they are advanced through a drying oven. Since the ovens are quite long, a chain conveyor carries the diodes therethrough while they are loosely disposed in pairs of opposing notched teeth. When the diodes are advanced beyond the oven they are typically removed and directed to a taping operation.

In a conventional process for removing articles from a chain conveyor, the articles are permitted to pass over a wheel and fall out of their loose seating or a notched transfer wheel picks them off the notched teeth. In a less conventional removal process, a belt having a magnetically attractive underside passes over the top of the chain conveyor and the articles are drawn upward from their seats and into contact with the belt. In such a removal process the articles are advantageously conveyed by the same belt to a subsequent operation with tolerable change in article orientation.

Removing articles from the top of a conveyor has the advantage that elevation is conserved in a production line so the force of gravity can be used to feed a subsequent operation. In feeding a taping operation after coding diodes, for example, an inclined magnetic bin is used wherein the diodes are suspended, virtually without contacting the articles. Such lack of contact is ideal for handling freshly painted diodes so a magnetic bin offers a significant advantage over a magnetic belt which contacts the articles drawn to it.

Consequently, it is desirable to develop a magnetic bin to remove articles from the top of a conveyor and further to use the same bin to feed a subsequent operation. Of course, when articles are optionally removed from a second location along a chain conveyor, the removal by the magnetic bin should be interrupted and the articles retained on the conveyor until they are advanced to the second location.

SUMMARY OF THE INVENTION

In view of the foregoing, it is an object of this invention to provide new and improved apparatus and methods for removing magnetic articles from a carrier. Another object is to remove such articles from optional locations along the periphery of a carrier. A further object is to magnetically remove the articles from a first location, to optionally interrupt such removal and to retain the articles on the carrier until they are removed at a second location.

With these and other objects in mind, the present invention includes apparatus for magnetically removing articles from a first location along the periphery of a carrier and for removing the articles from a second locaton therealong. A movable retention mechanism is provided at a first position within the periphery of the carrier for magnetically retaining the articles on the carrier when at least a portion of such mechanism is optionally moved to a second position adjacent to the periphery. The articles are advanced along the mechanism and are thereby retained on the carrier along and beyond the first location to the second location.

In a further embodiment, a bin having an inlet end in communication with the carrier at the first location is provided to magnetically remove the articles. The bin includes spaced sidewalls extending at least to either side of the periphery of the carrier. There is established in the bin a first magnetic field of sufficient strength relative to the weight and material of the articles and the conditions on the carrier to remove the articles therefrom.

Another embodiment includes apparatus for establishing a movable second magnetic field within the periphery of the carrier. This second field is sufficiently strong to retain the articles as they are advanced over a first distance along the first location and over a second distance therefrom to a second location.

In a preferred embodiment, the apparatus for producing the second magnetic field includes a substantially permanently magnetized structure which further includes a fixed member and a movable member. The fixed member has a first end adjacent to the first location and extends from the first location along the second distance to a second end at the second location. The movable member has a free end and a mating end which is pivotally mounted to the first end of the fixed member, leaving sufficient length along the movable member to retain the articles along the first distance. An actuating device is provided for pivotally moving the free end of the movable member from a normally inactive position to an active position at the first location. A substantially continuous, composite member is optionally formed thereby extending for the first and second distances over which the articles are retained on the carrier.

A method for removing magnetic articles from a similar carrier includes magnetically removing the articles from a first location along the periphery of the carrier. The articles are optionally retained on the carrier by the steps of supporting a magnetic retention mechanism at a first position within the carrier and by optionally moving at least a portion of the mechanism to a second position adjacent to the periphery of the carrier. The articles advance along the mechanism and are thereby magnetically retained until they are removed at a second location.

BRIEF DESCRIPTION OF THE DRAWING

The above-described and other objects, advantages, and features of the invention will be more readily understood from the following detailed description when read in conjunction with the accompanying drawing, wherein:

FIG. 2 is an abbreviated plan view of the apparatus shown in FIG. 1.

Figure 1:
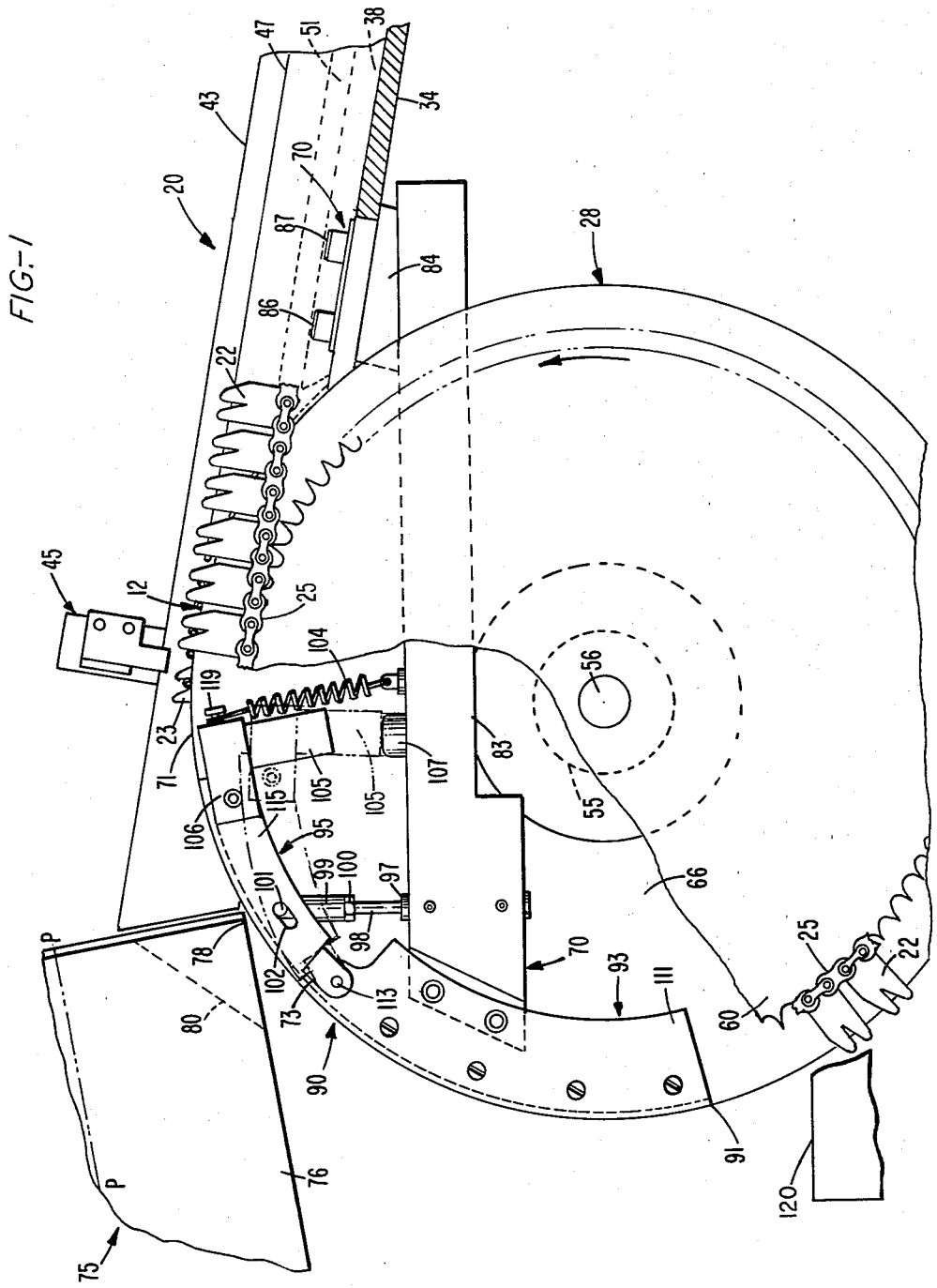
FIG. 1 is a partially cut-away, elevation view of an end portion of a typical chain conveyor for advancing articles from an unseen diode coding operation. The view partially depicts a magnetic bin for removing diodes and also shows an optionally actuated, magnetic retention mechanism, in accordance with the instant invention.

It can be seen that some elements in the figures are abbreviated or simplified to highlight certain features of the invention. Also, where appropriate, reference numerals have been repeated in the figures to designate the same or corresponding features in the drawing.

DETAILED DESCRIPTION

The Elongated Magnetic Articles

In each of FIGS. 1 and 2 there is shown one or more elongated magnetic articles 12 which have been loosely seated upon pairs of opposing notched teeth on a chain conveyor. For purposes of illustration, the articles 12 will often be identified and referred to as axially leaded diodes 12. However, it will be appreciated that other elongated magnetic articles 12 can as well be handled in the practice of the invention.

Referring again to FIG. 2, the diode 12 is seen to have wire-like leads 14 and 15 extending in opposite directions, typically in a collinear manner, from a generally central body 16. In an illustrative example, which will be used hereinafter unless otherwise specified, a typical diode 12 is assumed to be about 3.375 inches long and weigh about 0.243 grams. Each lead 14 or 15 is about 0.020 inches in diameter and about 1.563 inches long. The body 16 is cylindrical in shape, being about 0.120 inches in diameter and about 0.250 inches long.

The body 16 contains an electronic device (not shown) which has a cathode connected to one external lead such as lead 14 and, in this example, an anode connected to the other external lead 15. The diode 12 is thus directionally sensitive from a polarity standpoint although such polarity typically cannot be discerned by visual observation of the shape of the diode 12.

The leads 14 and 15 and certain parts of diode 12 within the body 16 are made of a magnetic material; i.e., a material which is attracted to a magnet. Therefore, diodes 12 are affected by magnetic forces and magnetic means are advantageously used to manipulate such diodes.

The Carrier

Referring to FIG. 1, an end portion of a carrier, in this case, a chain conveyor designated generally by the numeral 20, can be seen for advancing articles along the periphery thereof. This type of carrier is typically used where articles are to be advanced for a lengthy, straight distance, such as for advancing freshly painted diodes through and beyond a drying oven (not shown). The diodes 12 are loosely held in seats which include notched front teeth 22 and notched rear teeth 23 arranged in opposing pairs and drawn by a front chain 25 and a rear chain 26 (not visible in FIG. 1), respectively. The chains 25 and 26 are drawn by an unseen drive wheel at the unseen entrance to the oven and a follower wheel is seen in FIG. 1 designated generally by the numeral 28.

In FIG. 2, it can be seen that conveyor 20 is primarily supported by vertically planar, longitudinally inclined members 30 and 31, across which there is disposed a connective support plate 34. Plate 34 has an opening 36 to receive a portion of wheel 28 and another smaller plate 38 overlies and attaches to plate 34, also having an opening 40 to receive a portion of wheel 28. There are at least four vertically planar, longitudinal strips attached to plate 34 for various functions. Strips 42 and 43 run the length of plate 34 for guiding diodes 12 and there is a photocell 45 mounted to strip 43 for counting the diodes. Strips 46 and 47 form roller rails upon which the diodes 12 bear and roll as such diodes are advanced therealong. Filler plates 50 and 51 are attached to plate 38 such that chain 25 is guided between filler strip 50 and roller rail 46 while chain 26 is guided between filler plate 51 and roller rail 47, respectively.

Wheel 28 is built upon a central hub 55 mounted to a shaft 56. Hub 55 includes a cylindrical portion having two flanges (not shown) to which are attached sprocket discs 60 and 61 for receiving chains 25 and 26, respectively. Also attached to the unseen flanges are large stabilizing discs 62 and 63 having portions 64 and 65, respectively, disposed in the spaces adjacent to sprocket discs 60 and 61.

As the chains 25 and 26 advance, a diode 12 is transferred from roller rails 46 and 47 to wheel 28 where such diode is then carried on the peripheral surfaces of stabilizing discs 62 and 63. The body 16 of a diode 12 is suspended within a central area designated generally by the numeral 66, which area is dedicated primarily to a relatively stationary retention mechanism designated generally by the numeral 70 which will be described hereinafter.

Magnetically Removing Articles

It will be appreciated that diodes 12 become loosely seated upon the wheel 28 and would be displaced therefrom by the force of gravity as the wheel turns downward. However, as will be later explained, the retention mechanism 70 retains the articles 12 on wheel 28 when mechanism 70 is in the position shown for illustration in the figures. Nevertheless, under normal conditions, mechanism 70 is not actuated to the position shown in the figures, and the articles 12 will be considered as loosely seated on wheel 28 for descriptive purposes. Consequently, in the preferred operation, the diodes 12 are drawn from the wheel 28 when they are advanced to a first location shown in FIG. 1, starting at about point 71 and continuing for a first arcuate distance along the peripheral circle formed by wheel 28 to about point 73. The means shown for drawing the diodes 12 upward is a magnetic bin designated generally by the numeral 75 and only partially shown in the drawing.

The general features of a magnetic bin such as bin 75 and the principles by which such a bin is adapted to orient, suspend, and advance magnetic articles, are adequately described elsewhere. For example, copending patent application Ser. No. 65,031, now U.S. Pat. No. 4,262,805, filed Aug. 9, 1979, assigned to the assignee of the instant application, explains that in one embodiment of such a bin a magnetic field is generated between two spaced sidewalls by placing substantially permanent magnets in each sidewall. In such a configuration, there is established a plane of balanced magnetic forces which runs longitudinally of the bin and intersects the sidewalls at about the midpoint of their height. Articles which are magnetic, i.e., are attracted to a magnet, are found to seek the plane of balanced forces, becoming suspended thereat with an orientation transverse to the sidewalls. Moreover, the magnetic forces are of substantially uniform magnitude within the boundaries of the magnetic field along the plane of balanced forces. Therefore, when such a bin is inclined, the magnetic articles advance under the force of gravity along the plane of balanced forces. Embodiments of the above principles for feeding a taping operation are shown in copending patent application Ser. No. 172,730, now U.S. Pat. No. 4,324,600, filed Aug. 28, 1980, also assigned to the assignee of this application, and such application is hereby incorporated herein by reference. As seen therein, one embodiment of a loading bin includes four magnets disposed in each of two sidewalls. Consequently, each sidewall includes a composite magnet having a distance between poles of about 1.500 inches. The magnetic field thus created is found to adequately orient and suspend diodes, such as the diodes 12 described in the instant application.

It will be appreciated, by reference to the known prior art, that magnetic bins are typically used to load a carrier such as a transfer wheel or a testing wheel. The periphery of such a wheel intrudes within the boundary of a bin, physically lifts the articles and carries them through the strong boundary of the field which otherwise tends to inhibit articles from leaving the bin. However, it is believed that magnetic bins have not heretofore been used to reverse the process, i.e., to remove articles directly from carriers. Nevertheless, applicants have found such a utilization of magnetic bins to be effective, particularly when articles are so closely spaced that removing them with transfer wheels would be difficult. For example, in FIG. 1 it can be seen that diodes 12 are even loaded between teeth to double the efficiency of the carrier 20, and such diodes are now spaced on 0.250 inch centers, a very close spacing for a transfer wheel.

In the design of bin 75, shown in FIG. 2, spaced sidewalls 76 and 77 extend at least to either side of the periphery of the wheel 28. There is established between and transverse to the sidewalls a magnetic field of sufficient strength relative to the weight and material of the diodes 12 and the conditions on the wheel 28 to remove the articles therefrom. Such conditions include, but are not limited to, the speed of article advancement, vibration, residual magnetism on wheel 28, and tackiness of surfaces. In the example shown, four flat magnets, each about 0.375 inches thick, are provided in each sidewall such that the distance between poles is about 1.500 inches (only three magnets 121 or 122 are shown in each sidewall in FIG. 2). The magnetization extends through the thickness of the material so the flux lines of the first field extend substantially transversely of the sidewalls 76 and 77. Care has been taken to adjust the elevation of each such sidewall so the flux lines are also disposed substantially parallel to the elongate dimensions of the diodes 12 on the wheel 28.

By reference to the patent application Ser. No. 65,031, now U.S. Pat. No. 4,262,805, previously mentioned, it has been noted that using the planar magnets which are vertically disposed causes a plane of balanced forces to occur at mid-heighth of the sidewalls shown foreshortened in the drawing. The plane is nevertheless shown at about the correct height on the sidewalls and is depicted by a line P—P. Also, by reference to the same patent application, it can be shown that disposing vertically planar magnets in a spaced parallel manner causes the magnetic flux to be advantageously distributed for diode removal purposes. For example, it is found that the flux density near the inside surfaces of sidewalls 76 and 77 at the corners 78 and 79, respectively, is quite intense because there are many short paths for the flux to travel from one pole face to an opposite pole face of the same composite magnet in the same sidewall. Since the corners 78 and 79 are disposed close to the diodes 12 the flux density thereat would tend to draw the diodes 12 from the seats on the wheel. However, the plane of balanced magnetic forces is at a higher elevation. Therefore, the diodes 12 tend to continue rising toward such plane on a curved pathway caused by their momentum and the incline of the bin 75. The diodes then advance forward of bin 75 in a suspended manner toward the outlet end of bin 75 and the next operation. It can be seen that the thickness of each sidewall is slightly decreased at corners 78 and 79 and the wall material is bent along lines 80 and 81, respectively, to guide an errant diode 12 into the bin 75.

The operation of the magnetic bin 75 has been explained with regard to loosely seated diodes 12, which normally are present when a subsequent operation, fed by bin 75 is working well. However, such is not always the case, and the diodes 12 are sometimes optionally retained on wheel 28 so they may be removed from a second location beyond point 91 along the peripheral circle of wheel 28 shown in FIG. 1. For illustration purposes, the figures are, therefore, drawn to indicate a condition when the articles are retained on wheel 28 by the mechanism 70 located within the central area 66 of wheel 28.

Optionally Retaining Articles On A Carrier

As is best seen in FIG. 1, mechanism 70 is supported by a cantilevered support 83 which is vertically oriented by a wedge shaped spacer 84, and support 83 is fixedly attached to plate 34 by studs 86 and 87. Support 83 extends within area 66 to the upper forward sector of wheel 28, where a substantially permanently magnetized structure, designated generally by the numeral 90, is supported thereon. Structure 90 extends along and inside the periphery of wheel 28 for the first arcuate distance from point 71 to point 73 and for a second arcuate distance from point 73 to point 91. It will be seen that structure 90 establishes a second magnetic field of sufficient strength to retain the diodes 12 on wheel 28 as such diodes are advanced over the first and second distances by overcoming forces tending to remove the diodes. Such forces include, but are not limited to, the force of gravity, vibration, and the attraction of the first magnetic field of bin 75.

Structure 90 includes a fixed member designated generally by the numeral 93, havng a first end at point 73 adjacent the first location and a second end at point 91 adjacent the second location. It will be appreciated that the second location is arbitrarily set beyond point 91 for purposes of illustration. Actually point 91, and therefore, the second location could be set at practically any convenient place beyond the first location. Diodes 12 are not retained on wheel 28 beyond point 91 so such diodes are optionally removed thereat by a suitable means, including means 120 (FIG. 1) which, inter alia, may involve letting them fall into a container or into another magnetic bin or chute.

Structure 90 also includes a movable member designated generally by the numeral 95, having a free end at point 71 and a mating end at point 73. In the example shown, member 95 is pivotally mounted at its mating end to the first end of member 93 so member 95 can be optionally moved from a first position which is a normally inactive position shown by phantom lines to a second position which is an active position shown by solid lines in the figures.

Means for moving member 95 include an air cylinder 97 mounted to support 83 and air supply means (not shown) to drive a piston 98. An arm 99 is affixed to piston 98 by a jam nut 100 and arm 99 is further connected to member 95 by a pin 101 disposed within a slot 102. The return action of cylinder 97 in moving member 95 to an inactive position is assisted by a spring 104 attached to the free end of member 95 and to the support 83. A versatile member designated generally by the numeral 105 is also attached to member 95 by a clip 106 and member 105 serves to stop movement of member 95 by abutting a bumper 107 when member 95 is moved to the inactive position. It can be seen that when member 95 is in the active position adjacent to member 93, there is formed a substantially continuous, composite member extending for the first and second distances over which the diodes 12 are retained on wheel 28.

Referring to FIG. 2, it can be seen in plan view that fixed member 93 includes a substantially permanent magnet 110 disposed between magnetically permeable pole plates 111 and 112. Magnet 110 is preferably a molded plastic material such as that sold by 3M Company of Minneapolis, Minn. under the trade designation "Plastiform Natsyn PL-1." A thickness of 0.375 inches is selected in the example shown to space plates 111 and 112 wide enough to receive a body 16 of a diode 12 therebetween. The outside edges of plates 111 and 112 are so disposed that the leads 14 and 15, respectively, of a diode 12 slide thereupon as such diode is advanced by chains 25 and 26. It will later be shown that the pole plates 111 and 112 serve as pole pieces for member 93.

Movable member 95 includes two pole plates 115 and 116 made of magnetically permeable metal, which also serve as pole pieces. Plates 115 and 116 are pivotally joined to plates 111 and 112, respectively, of member 93 by overlapping links 113 and 114. Plates 115 and 116 are disposed in a substantially parallel manner with a substantially magnetically non-permeable member 117 disposed therebetween. In the preferred example, member 117 is an aluminum block made 0.375 inches wide to conform with the body 16 of a diode 12 as above described with respect to magnet 110. Member 117 has an opening 118 as shown to accommodate the connective arm 99 described previously.

It will be appreciated that the polarity of magnetized members 93 and 95 extends through the thickness of such members. Therefore, a lead 14 rides on continuously joined north pole pieces and a lead 15 rides on continuously joined south pole pieces as a diode 12 is advanced from point 71 to point 91 on the peripheral circle formed by wheel 28.

In forming a tight joint between members 93 and 95 at point 73, it is found that strongly magnetized members having the given polarity tend to repel one another and to resist tight closure at such a joint. Accordingly, it has been found advantageous to avoid having member 117 comprised of a permanent magnet similar to magnet 110. Instead, pole plates 115 and 116 are made magnetically permeable such that when the joint is pivotally closed at point 73, magnetic flux is induced from the respective poles of the fixed member 93 into pole plates 115 and 116. It is often found that such induced magnetism is sufficient to retain articles as they are advanced over the first distance to point 73 where the fixed member thereafter retains the articles as they traverse the second distance.

The sufficiency of the magnetism induced into pole plates 115 and 116 depends upon the weight and material of the articles 12, the strength of magnet 110, the speed of advancement of articles 12, and the strength of the first magnetic field. In the example shown, it is presumed that additional magnetism is needed so the second magnetic field is reinforced by application of a substantially permanent magnet at the free end of movable member 95 to serve as member 105. A suitable selection of a magnet to serve as member 105 is a combination of aluminum, nickel, and cobalt designated as Alnico 5 or 8 material sold by the Indiana Company, a Division of Electronic Memories and Magnetics Company, Valparaiso, Ind., and formed into the horseshoe cross-section as shown.

Member 105 is held at the free ends of pole plates 115 and 116 by clip 106 and a set screw 119. By loosening screw 119, the member 105 can be slidably vertically adjusted to enable member 95 to be set at a proper position. The proper active position for member 95 is such that the second magnetic field overcomes the forces tending to remove diodes 12 from the wheel 28, including the attraction of the first magnetic field. The proper inactive position for member 95 is such that the second magnetic field does not interfere with the normal magnetic removal of diodes 12 by the first magnetic field along the first location. Therefore, given known conditions on wheel 28, there is a balancing of magnetic forces at the first location in operation of the invention.

Alternate Embodiments

Referring to FIG. 1, it can be seen that structure 90 need not be comprised of two members. Accordingly, it is within the spirit and scope of this invention to form structure 90 of one long member extending from point 71 to point 91 over the first and second distances. Then, to move the second magnetic field from an inactive to an active position, structure 90 could be translated radially to the active position shown or it could be pivoted about point 91.

It is within the spirit and scope of this invention to mount movable member 95 pivotally at the first end of fixed member 93 by different means. For example, the mating end of member 95 could be pivotally mounted to a vertical extension of support 83. Moreover, the entire length of member 95 could be radially translated from an inactive to an active position at the first location.

There have been illustrated herein certain embodiments of the invention and certain applications thereof. Nevertheless, it is to be understood that various modifications and refinements may be made and used which differ from these disclosed embodiments without departing from the spirit and scope of the present invention.

What is claimed is:

1. Apparatus for removing magnetic articles from a carrier having a periphery along which such articles are advanced, comprising:
   means for magnetically removing the articles from a first location along the periphery of the carrier;
   means for removing the articles from a second location along the periphery of the carrier; and
   a retention mechanism at a first position within the periphery and supported independently of movement of the carrier, said mechanism having means for magnetically retaining the articles on the carrier when at least a portion of such mechanism is optionally moved to a second position adjacent to the periphery and supported independently of movement of the carrier such that the articles are advanced along the mechanism and are thereby retained on the carrier along and beyond the first location to the second location.

2. Apparatus as in claim 1, wherein the means for magnetically removing the articles from the first location further comprises:
   a bin for removing the articles, having an inlet end in communication with the carrier at the first location, including spaced sidewalls extending at least to either side of the periphery of the carrier; and
   means for establishing between and transverse to said sidewalls a first magnetic field of sufficient strength relative to the weight and material of the articles and the conditions on the carrier to remove the articles therefrom.

3. Apparatus as in claim 2, wherein the flux lines of the first magnetic field are disposed substantially parallel to the elongate dimensions of the articles on the carrier at the first location and wherein the magnetic flux is so distributed within the first field that the articles are thereby drawn from the carrier and suspended within the bin with a desired orientation.

4. Apparatus as in claim 2, wherein the retention mechanism further comprises:
   means for optionally establishing a second magnetic field substantially within the periphery of the carrier, said field extending along said periphery for a first distance along the first location and for a second distance from the end of the first location to the second location, the field being sufficiently strong to retain the articles on the carrier as such articles are advanced along and over the first and second distances by overcoming forces tending to remove the articles, including the attraction of the first magnetic field.

5. Apparatus as in claim 4, wherein the means for establishing the second magnetic field further comprises:
   a substantially permanently magnetized structure, including means for optionally moving at least a portion of said structure from the first position which is a normally inactive position within the periphery of the carrier and is away from the articles thereon, to the second position which is an active position adjacent to the periphery of the carrier, such that said structure extends along and within the periphery of the carrier for the first and second distances over which the articles are retained on the carrier.

6. Apparatus as in claim 5, wherein the magnetized structure includes a fixed member having a first end substantially adjacent to the first location, said member extending from the first location along the second distance to a second end at the second location, and a movable member having a free end and a mating end, there being sufficient length along such movable member to retain the articles along the first distance, the means for optionally moving further comprising:
   means for moving the movable member from a normally inactive position within the periphery of the carrier and away from the articles thereon to an active position adjacent to the periphery of the carrier at the first location, said movable member engaging the fixed member such that the movable and the fixed member form a substantially continuous, composite structure extending for the first and second distances over which the articles are retained on the carrier.

7. Apparatus as in claim 6, wherein the movable member further comprises:
   a pair of magnetically permeable pole pieces disposed in a substantially parallel manner, having mating ends pivotally mounted at the first end of the fixed member and extending over the first distance to free ends when the movable member is in the active position such that the mating ends of the pole pieces engage the first end of the fixed member and magnetic flux is induced from the respective poles of the fixed member into the pole pieces of the movable member sufficiently to retain articles on the carrier over the first and second distances.

8. Apparatus as in claim 7, wherein the second magnetic field is reinforced by application of a substantially permanent magnet to the free ends of the pole pieces of the movable member.

9. A method of removing magnetic articles from a carrier having a periphery along which such articles are advanced, comprising:
   magnetically removing the articles from a first location along the periphery of the carrier;
   supporting a retention mechanism at a first position within the periphery independently of movement of the carrier, said mechanism having means for magnetically retaining the articles on the carrier when at least a portion of said mechanism is moved with respect to the remainder of the mechanism;
   optionally moving at least a portion of the retention mechanism to a second position adjacent to the periphery and supported independently of movement of the carrier such that the articles are advanced along the mechanism and are thereby magnetically retained on the carrier along and beyond the first location to a second location; and removing the articles from the second location along the periphery of the carrier.

10. A method as in claim 9, wherein magnetically removing the articles from the first location further comprises:

removing the articles with a bin having an inlet end in communication with the carrier at the first location, including spaced sidewalls extending at least to either side of the periphery of the carrier; and establishing between and transverse to said sidewalls a first magnetic field of sufficient strength relative to the weight and material of the articles and the conditions on the carrier to remove the articles therefrom.

11. A method as in claim 10, wherein establishing the first magnetic field further comprises:

establishing flux lines in the first magnetic field in a manner substantially parallel to the elongate dimensions of the articles on the carrier at the first location; and distributing the magnetic flux within the first field such that the articles are thereby drawn from the carrier and suspended within the bin with a desired orientation.

12. A method as in claim 10, wherein the step of optionally moving at least a portion of the retention mechanism further comprises:

establishing a second magnetic field substantially within the periphery of the carrier extending for a first distance along the first location and extending from the first location for a second distance to the second location, said field being sufficiently strong to retain the articles on the carrier as such articles are advanced over the first and second distances by overcoming forces tending to remove the articles, including the attraction of the first magnetic field.

13. A method as in claim 12, wherein establishing the second magnetic field further comprises:

optionally moving at least a part of a substantially permanently magnetized structure from the first position which is a normally inactive position within the periphery of the carrier and is away from the articles thereon, to the second position which is an active position adjacent to the periphery of the carrier, such that said structure extends along and within the periphery of the carrier to the first and second distances over which the articles are retained on the carrier.

14. A method as in claim 13, wherein the magnetized structure includes a fixed member and a movable member, the establishing step including optionally moving further comprising:

disposing the fixed member, with a first end substantially adjacent to the first location, such member extending therefrom along the second distance ending in a second end at the second location; and moving the movable member from a normally inactive position within the periphery of the carrier and away from the articles thereon to an active position adjacent to the periphery at the first location such that a mating end of such member engages the first end of the fixed member and said movable member extends therefrom along the first distance to a free end, the movable member and the fixed member thereby forming a substantially composite structure extending for the first and second distances over which the articles are retained on the carrier.

15. A method as in claim 14, wherein the movable member includes a pair of magnetically permeable pole pieces disposed in a substantially parallel manner, having mating ends pivotally mounted at the first end of the fixed member and extending therefrom to free ends, there being sufficient length therebetween to retain the articles over the first distance, further comprising:

optionally pivotally moving the movable member to the active position adjacent to the periphery of the carrier such that the mating ends of the pole pieces engage the first end of the fixed member and magnetic flux is induced from the respective poles of the fixed member into the pole pieces of the movable member sufficiently to retain articles on the carrier over the first and second distances.

16. A method as in claim 15, further comprising:

reinforcing the second magnetic field by application of a substantially permanent magnet to the free ends of the pole pieces of the movable member.

* * * * *

UNITED STATES PATENT AND TRADEMARK OFFICE
CERTIFICATE OF CORRECTION

PATENT NO. : 4,356,905
DATED : November 2, 1982
INVENTOR(S) : D. M. Large

It is certified that error appears in the above—identified patent and that said Letters Patent is hereby corrected as shown below:

Column 2, line 38, "locaton" should be --location--.

Column 12, line 2, "to" should be --for--.

Signed and Sealed this

Twenty-second Day of February 1983

[SEAL]

Attest:

GERALD J. MOSSINGHOFF

Attesting Officer     Commissioner of Patents and Trademarks